Oct. 23, 1945.   C. M. TERRY   2,387,364
AUTOMATIC VALVE MECHANISM
Filed Feb. 4, 1944

Inventor
CHARLES M. TERRY
By Albert G. Blodgett
Attorney

Patented Oct. 23, 1945

2,387,364

UNITED STATES PATENT OFFICE 2,387,364

AUTOMATIC VALVE MECHANISM

Charles M. Terry, Decatur, Ill., assignor to A. W. Cash Company, Decatur, Ill., a corporation of Delaware Application February 4, 1944, Serial No. 521,091

4 Claims. (Cl. 137—153)

This invention relates to automatic valve mechanisms, and more particularly to the construction and arrangement of a valve which will operate to maintain a substantially constant drop in the pressure of the fluid traveling therethrough. This application is a continuation-in-part of my prior application Serial No. 491,100, filed June 17, 1943.

The said prior application discloses an automatic valve mechanism comprising a valve body having a valve member slidably mounted therein, the movements of the valve member being controlled by the joint action of the fluid pressure and of a coiled spring. In order to apply the fluid pressure in the required manner, a slidable piston is provided in alignment with the valve member. With valves of the larger sizes, which are of course connected to large heavy pipes, the valve body may be slightly distorted by the mechanical stresses imposed thereon by the pipes. This may prevent free sliding movement of the valve member and the piston, causing erratic operation of the mechanism.

It is accordingly one object of the invention to provide an automatic valve mechanism so constructed that the valve member and piston will slide freely despite slight distortion of the valve body.

It is a further object of the invention to provide an automatic valve mechanism which will be thoroughly dependable in service.

It is a further object of the invention to provide an automatic valve mechanism of the type having a valve member controlled by fluid pressure and by a spring, the construction being such that failure of the spring cannot prevent the valve from opening under the influence of the fluid pressure.

With these and other objects in view, as will be apparent to those skilled in the art, the invention resides in the combination of parts set forth in the specification and covered by the claims appended hereto.

Referring to the drawing illustrating one embodiment of the invention, and in which like reference numerals indicate like parts:

Figure 2:
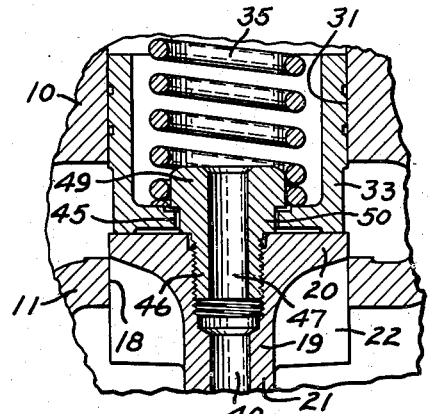
Fig. 2 is an enlarged view of a portion of the mechanism in longitudinal section.
Figure 1:
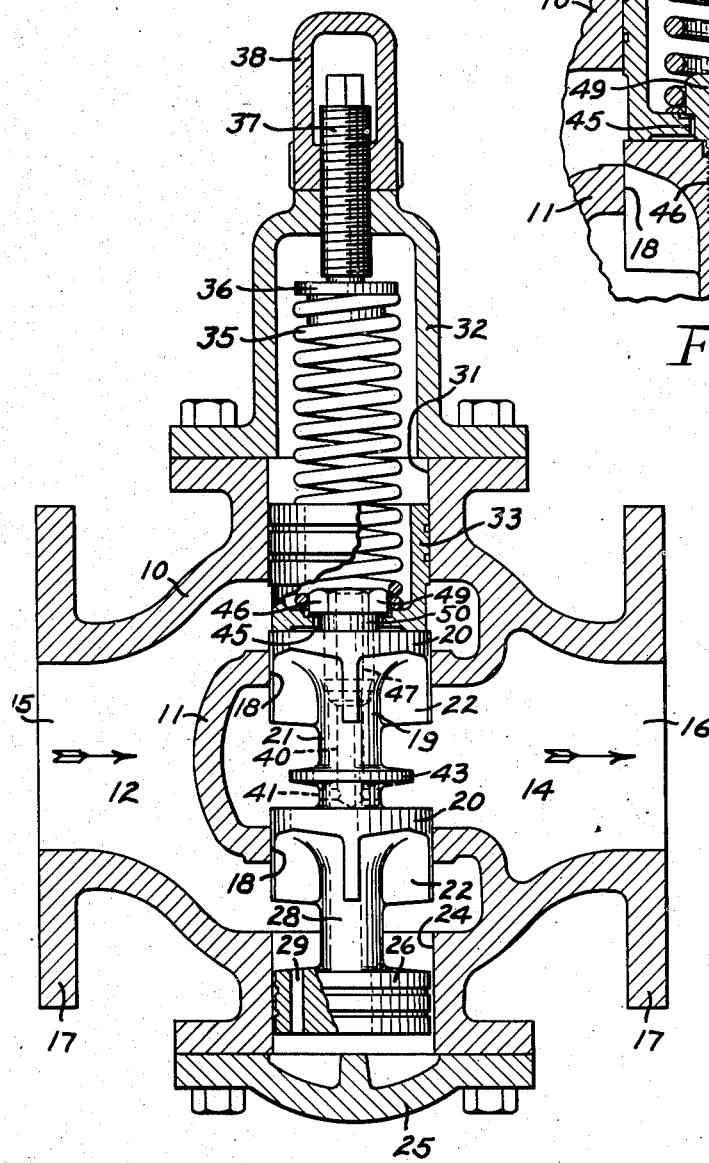
Fig. 1 is a longitudinal section through an automatic valve mechanism, with certain parts shown in full.
Figure 3:
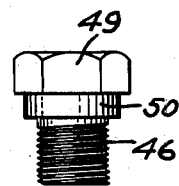
Fig. 3 is a detail of a retaining screw.

The embodiment illustrated comprises a hollow body or casing 10 which is divided internally by a partition 11 to provide an inlet chamber 12 and an outlet chamber 14. The body 10 is provided on opposite sides with external openings 15 and 16 which communicate with the inlet and outlet chambers respectively, these openings being surrounded by flanges 17 so that the body may be readily connected to inlet and outlet pipes (not shown). The partition 11 is shaped as a horizontally positioned U, with the interior of the U forming a portion of the outlet chamber 14. Each of the two horizontal branches of the U is provided with a cylindrical port 18, the two ports being vertically aligned and of the same diameter. Within these ports there is mounted a vertically slidable valve member 19 of the balanced type having two cylindrical portions or disks 20 to control the flow through the ports, these disks being connected by a vertical stem 21. Guide wings 22 depend from each disk 20 to engage the walls of the ports and maintain the valve member in proper alignment with the ports. Upward movement of the valve member opens the ports for increased flow of fluid therethrough.

Means is provided to steady the movements of this valve member and prevent surging or fluttering thereof. For this purpose the body 10 is shaped to provide a vertical cylindrical bore 24 directly beneath the lower port 18 and aligned therewith. A plate 25 is secured to the bottom of the body to close the lower end of this bore. Within the bore 24 there is mounted a vertically slidable piston 26 which is connected to the lower disk 20 of the valve member by means of a vertical stem 28. A restricted port 29 extends through the piston 26 to form a by-pass, and the piston preferably fits rather loosely in the bore 24. This construction provides a dashpot whereby the desired steadying effect is obtained.

In order to control the operation of the valve in accordance with the fluid pressure drop across the same, the body 10 is shaped to provide a vertical cylindrical bore 31 directly above the upper port 18 and aligned therewith. This bore preferably has substantially the same diameter as the port. The upper end of the bore 31 communicates with the interior of a chamber 32 which is secured to the top of the body. A cup-shaped piston 33 is vertically slidable in the bore 31, and engages the top of the valve member 19. The piston 33 and valve member 19 are urged downwardly by means of a vertical coiled compression spring 35 which extends upwardly into the chamber 32. The upper end of the spring engages a button 36 on the lower end of a vertical screw 37 which is threaded through the top of the chamber 32. A cap 38 is mounted on the upper portion of the screw to engage the top of the spring chamber and prevent any leakage of fluid. The interior of the spring chamber is connected with the outlet chamber 14, and for this purpose a passage 40 extends downwardly through the center of the upper disk 20 and the stem 21 to intersect with a passage 41 which extends diametrically through the stem 21.

It will now be apparent that the valve member 19 is urged upwardly toward its open position by the pressure of the fluid in the inlet chamber 12, this pressure being effective beneath the dashpot piston 26 and the lower valve disk 20. This upward force is opposed by the downward force of the spring 35 and by the fluid pressure inside the chamber 32, this pressure being effective above the piston 33 and being equal (under static conditions) to the pressure in the outlet chamber. Thus the valve will remain closed so long as the fluid pressure differential between the inlet chamber and the outlet chamber is below a predetermined value which is dependent upon the adjustment of the screw 37. Whenever the pressure differential exceeds the said predetermined value, the valve member will be raised to allow flow through the ports 18.

Preferably the construction is such that a comparatively slight increase in the pressure differential will open the valve widely and thus allow a large volume of fluid to flow through the valve. This is accomplished by utilizing the flow of the fluid to cause a reduction in the pressure above the piston 33 as compared with the pressure in the outlet chamber 14. For this purpose I prefer to utilize the fluid flowing through the upper port 18 to create an aspirating effect on the passage 41. The fluid entering the outlet chamber 14 through the upper port 18 tends to travel at comparatively high velocity downwardly along the stem 21. Directly above the passage 41 this stem is provided with a baffle plate in the form of an outwardly extending flange or rib 43 which preferably completely surrounds the valve stem. This baffle serves to direct the downwardly flowing fluid in an outward direction away from the stem, and this has the effect of reducing the pressure beneath the baffle and thereby aspirating fluid out of the chamber 32 through the passages 40 and 41. As a result the pressure above the piston 33 is reduced, causing the valve to open much farther than it would otherwise, and permitting a much greater flow to take place.

If the spring 35 should break, or if a careless operator should install too short a spring or withdraw the screw 37 so far as to relieve the spring of all load, the piston 33 might become separated from the valve member 19. This would permit fluid to flow from the inlet chamber 12 through the space between the piston 33 and the upper valve disk 20. With the inlet chamber pressure effective on the top of the upper disk 20, the valve member 19 would be in hydrostatic balance, and it would remain closed no matter how great the fluid pressure differential might become. This would create a very dangerous situation.

In order to avoid this possibility, I provide means for retaining the piston 33 substantially in contact with the upper disk 20 without interfering with such slight lateral movements of the piston as might be required by misalignment resulting from distortion of the valve body. For this purpose the transverse bottom wall of the piston 33 is provided with a central opening 45, and the upper end of the passage 40 in the valve member 19 is tapped to receive a screw 46 which extends through this opening 45. A passage 47 extends longitudinally through this screw so that the passage 40 will not be obstructed. The screw 46 is provided with a head 49 which closely overlies the bottom wall of the piston surrounding the opening 45 to prevent any appreciable separation of the piston from the upper valve disk. Beneath the head 49 the screw is formed with a cylindrical portion 50 which provides a shoulder to engage the top of the valve member 19, thus positioning the head 49 at a predetermined distance from the upper valve disk 20. This portion 50 is slightly smaller in diameter than the opening 45, and hence fits loosely therein.

The operation of the invention will now be apparent from the above disclosure. The screw 37 will be adjusted so that the valve will start to open at a desired pressure differential of say fifteen pounds. So long as the pressure differential is less than fifteen pounds, the fluid pressure above the piston 33 added to the force of the spring 35 will hold the valve closed against the fluid pressure beneath the lower valve disk 20. If however the pressure differential exceeds fifteen pounds, the fluid pressure beneath the lower valve disk will lift the valve member 19 and flow will take place through the ports 18. The fluid passing through the upper port will travel downwardly along the stem 21 until it encounters the baffle 43, which will deflect the fluid outwardly away from the stem and thereby aspirate fluid from the passage 41 beneath the baffle. This will reduce the pressure above the piston 33 to a value appreciably below the pressure in the outlet chamber 14, and cause the valve to open much farther than it would otherwise. As a result flow can take place at a comparatively high rate with only a slight increase in the pressure differential. The dashpot 26 will prevent surging and fluttering.

The pipes connected to the valve body 10 may impose appreciable mechanical stresses thereon, resulting in slight distortion which may bring about a misalignment of the bores 24, 18, and 31. The dashpot piston 26 will continue to move freely, because of its loose fit in the bore 24. Furthermore the upper piston 33 will not bind, in spite of its comparatively close fit in the bore 31, for it is free to move laterally with relation to the valve member 19. Even though the spring 35 should break, or if a careless operator should install too short a spring or withdraw the screw 37 too far, the screw 46 will nevertheless prevent any appreciable separation of the piston 33 from the upper valve disk 20. Consequently the fluid pressure from the inlet chamber 12 cannot become effective above the upper valve disk 20 and thus prevent the valve from opening by placing the valve member in hydrostatic balance. The valve is certain to open whenever the pressure in the inlet chamber exceeds the pressure in the outlet chamber by an amount sufficient to overcome the force of the spring.

In the claims, certain terms such as "upper," "lower," "vertical," "horizontal," and the like are employed. It should be noted however that the apparatus can be mounted in positions other than that illustrated, and such terms are not intended as limitations except as they describe the relative positions of the various parts.

Having thus described my invention, what I claim as new and desire to secure by Letters Patent is:

1. Automatic valve mechanism comprising a hollow body, a partition shaped as a horizontally positioned U dividing the interior of the body into an inlet chamber and an outlet chamber, the interior of the U forming a portion of the outlet chamber and each branch of the U having a port therein with the ports vertically aligned, a vertically reciprocable valve member having two disks thereon associated with the respective ports to control the flow therethrough and closing in a downward direction, means providing a vertical bore above the upper port, a piston slidable in the bore and engaging the valve member, the piston and valve member being relatively movable laterally to prevent binding in the event of misalignment between the bore and the ports, the valve member having a passage therein which connects the outlet chamber with the space above the piston, and a spring urging the valve member downwardly.

2. Automatic valve mechanism comprising a hollow body, a partition shaped as a horizontally positioned U dividing the interior of the body into an inlet chamber and an outlet chamber, the interior of the U forming a portion of the outlet chamber and each branch of the U having a port therein with the ports vertically aligned, a vertically reciprocable valve member having two disks thereon associated with the respective ports to control the flow therethrough and closing in a downward direction, means providing a vertical bore above the upper port, a piston slidable in the bore and engaging the valve member, the piston and valve member being relatively movable laterally to prevent binding in the event of misalignment between the bore and the ports, the piston having a transverse wall with a vertical opening therethrough, means extending upwardly from the valve member through the opening and closely overlying the said transverse wall to prevent appreciable separation of the piston from the valve member, means providing a passage to transmit the fluid pressure in the outlet chamber to the upper surface of the piston, and a spring urging the valve member downwardly.

3. Automatic valve mechanism comprising a hollow body, a partition shaped as a horizontally positioned U dividing the interior of the body into an inlet chamber and an outlet chamber, the interior of the U forming a portion of the outlet chamber and each branch of the U having a port therein with the ports vertically aligned, a vertically reciprocable valve member having two disks thereon associated with the respective ports to control the flow therethrough and closing in a downward direction, means providing a vertical bore above the upper port, a piston slidable in the bore and engaging the valve member, the piston and valve member being relatively movable laterally to prevent binding in the event of misalignment between the bore and the ports, the piston having a transverse wall with a vertical opening therethrough, a vertical screw mounted in the valve member and extending loosely through the opening, the screw having a head thereon which closely overlies the said transverse wall to prevent appreciable separation of the piston from the valve member, means providing a passage to transmit the fluid pressure in the outlet chamber to the upper surface of the piston, and a spring urging the valve member downwardly.

4. Automatic valve mechanism comprising a hollow body, a partition shaped as a horizontally positioned U dividing the interior of the body into an inlet chamber and an outlet chamber, the interior of the U forming a portion of the outlet chamber and each branch of the U having a port therein with the ports vertically aligned, a vertically reciprocable valve member having two disks thereon associated with the respective ports to control the flow therethrough and closing in a downward direction, means providing a vertical bore above the upper port, a piston slidable in the bore and engaging the valve member, the piston and valve member being relatively movable laterally to prevent binding in the event of misalignment between the bore and the ports, the piston having a transverse wall with a central vertical opening therethrough, a vertical screw mounted in the center of the upper valve disk and extending loosely through the opening, the screw having a head thereon which closely overlies the said transverse wall to prevent appreciable separation of the piston from the valve member, the screw having a vertical passage therethrough which connects with a passage through the valve member to transmit the fluid pressure in the outlet chamber to the upper surface of the piston, and a spring urging the valve member downwardly.

CHARLES M. TERRY.